(12) United States Patent
Baraszu et al.

(10) Patent No.: US 10,160,342 B2
(45) Date of Patent: Dec. 25, 2018

(54) DYNAMIC ADJUSTMENT OF BATTERY CURRENT LIMITS BASED ON USAGE

(71) Applicant: GM GLOBAL TECHNOLOGY OPERATIONS LLC, Detroit, MI (US)

(72) Inventors: Robert C. Baraszu, Dearborn, MI (US); Daniel R. Brouns, Clarkston, MI (US); Patrick E. Frost, Berkley, MI (US); Kurt M. Johnson, Brighton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 334 days.

(21) Appl. No.: 15/247,266

(22) Filed: Aug. 25, 2016

(65) Prior Publication Data

US 2017/0282746 A1 Oct. 5, 2017

Related U.S. Application Data

(60) Provisional application No. 62/314,485, filed on Mar. 29, 2016.

(51) Int. Cl.
*H02J 7/00* (2006.01)
*B60L 11/18* (2006.01)

(52) U.S. Cl.
CPC ....... *B60L 11/1864* (2013.01); *B60L 11/1861* (2013.01); *B60L 2240/549* (2013.01); *B60L 2240/80* (2013.01)

(58) Field of Classification Search
USPC ......................................................... 320/134
See application file for complete search history.

(56) References Cited

U.S. PATENT DOCUMENTS

| | | | | |
|---|---|---|---|---|
| 5,814,973 | A * | 9/1998 | Liu ....................... | H02J 7/0093 320/137 |
| 2005/0077877 | A1 * | 4/2005 | Cawthorne ........... | B60W 10/26 320/128 |
| 2009/0134843 | A1 * | 5/2009 | Mizuno ............... | B60L 11/1861 320/134 |
| 2012/0235570 | A1 * | 9/2012 | Yu ...................... | H05B 33/0815 315/121 |
| 2012/0254595 | A1 * | 10/2012 | Wu ...................... | G06F 1/3203 712/208 |

(Continued)

*Primary Examiner* — Arun C Williams
(74) *Attorney, Agent, or Firm* — Quinn IP Law

(57) ABSTRACT

A method for dynamically adjusting a battery current limit in a system having a battery pack includes determining a battery pack current as a charge current flowing into or a discharge current flowing from the battery pack, and also calculating a time-windowed average current for each of the charge current, the discharge current, and an RMS current of the battery pack. The battery current limit may be dynamically adjusted when any or all of the calculated time-windowed averages exceeds a corresponding calibrated control threshold. The battery current limit is a window-specific current limit that is greater than the calibrated control threshold and less than a static/fixed current limit for the battery pack. A system includes the battery pack, a sensor operable for measuring a current inflow/outflow to/from the battery pack, and a controller programmed to dynamically adjust the battery current limit using the above method.

16 Claims, 3 Drawing Sheets

(56) References Cited

U.S. PATENT DOCUMENTS

2013/0193907 A1* 8/2013 Thomas ............... B60L 3/0069
320/107
2015/0171495 A1* 6/2015 Yadgar ............... H01M 10/443
429/403

* cited by examiner

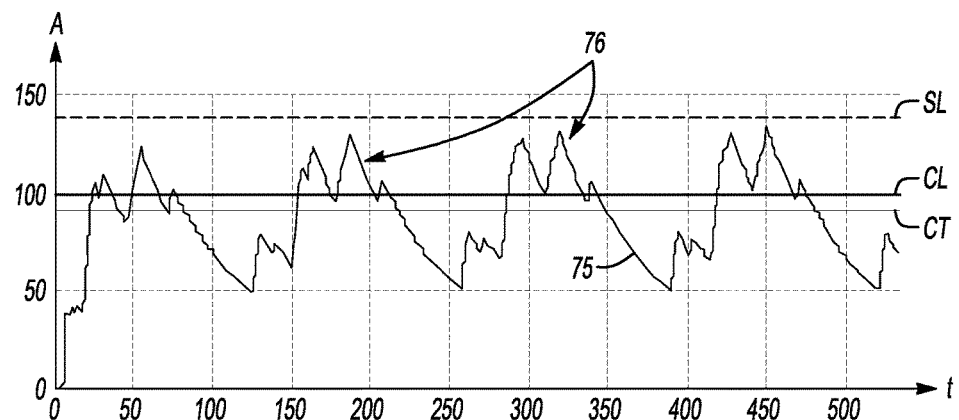
*Fig-4A*
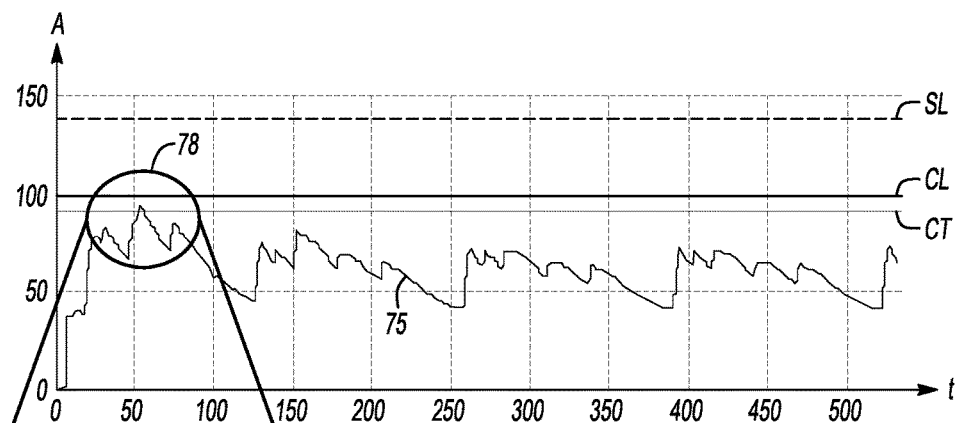
*Fig-4B*
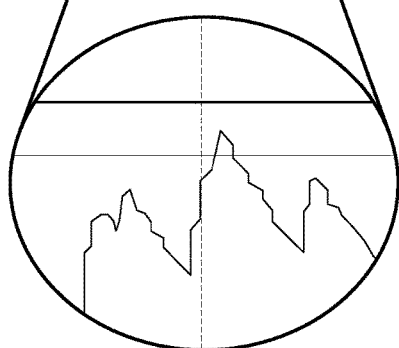

DYNAMIC ADJUSTMENT OF BATTERY CURRENT LIMITS BASED ON USAGE

CROSS-REFERENCE TO RELATED APPLICATIONS

This application claims the benefit of U.S. Provisional Application No. 62/314,485, filed Mar. 29, 2016, which is hereby incorporated by reference in its entirety.

TECHNICAL FIELD

The present disclosure relates to a usage-based method and system for dynamically adjusting battery current limits.

BACKGROUND

Electrochemical battery packs may be used to energize electric machines in a variety of systems. For instance, output torque from an electric machine in the form of a traction motor may be used to power an input member of a transmission, such as in a hybrid or battery electric powertrain, a static powerplant, or other torque generating system. The electric machine may be an alternating current (AC) or direct current (DC) motor/generator device that draws electrical energy from or delivers electrical energy to the battery pack as needed. In turn, the battery pack may be recharged via a charging current supplied from an offboard power supply or via onboard regeneration. The battery cells store an electric charge until such a charge is needed, while a reverse reaction discharges the battery pack to deliver electricity to the electric machine. Charging and discharging currents are closely regulated by a controller so as to avoid excess powerflow with respect to the battery cells, which can overheat the battery cells and degrade the battery pack.

SUMMARY

A method for dynamically adjusting battery current limits is disclosed herein. The method is intended for use with a battery pack. The present method, which may be programmed as a set of computer-executable instructions executed by a controller, is intended to improve upon existing battery pack performance and hardware protection relative to enforcement of static/fixed current limits alone, i.e., manufacturer-provided, temperature-based calibrated battery current limits. The controller automatically arbitrates battery current limits in such a manner that higher short-term current loads may be selectively permitted. Use of the present method may allow a given electrified system, such as a hybrid powertrain, to provide more power over the short term relative to strict adherence to the fixed current limits noted above.

In a particular embodiment, a method for dynamically adjusting a battery current limit in a system having a battery pack includes determining a battery pack current as a charge current into/discharge current from the battery pack. The method also includes calculating a time-windowed average current for each of the charge current, the discharge current, and an RMS current of the battery pack. A time window-specific current limit is dynamically adjusted when, in different embodiments, any or all of the calculated time-windowed averages exceeds a corresponding calibrated control threshold. The window-specific current limit used herein is greater than the calibrated control threshold and less than a fixed current limit for the battery pack. A controller then uses the adjusted battery current limit to control the battery pack.

The method may include, for each calculated time-windowed average current, comparing the calculated time-windowed average current to the corresponding calibrated control threshold and enforcing the window-specific current limit if the calculated time-windowed average current exceeds the calibrated control threshold. The fixed current limit is enforced in the alternative if the calculated time-windowed average current does not exceed the calibrated control threshold.

As part of the method, the controller may use as the battery current limit a minimum of the window-specific current limit and the calculated time-windowed average RMS current.

Optionally, the controller may track over time how closely the calculated average current approaches the window-specific current limit, and increase or decrease the control threshold as a function of a difference between the calculated average current and the window-specific current limit.

A system is also disclosed herein that, in an example configuration, includes a battery pack, a sensor, and a controller. The battery pack has a fixed current limit of the type noted above. The sensor measures a battery pack current as a charge current flowing into or a discharge current flowing from the battery pack. The controller is operable for receiving the measured battery pack current and calculating a time-windowed average current for each of the charge current, the discharge current, and an RMS current. Additionally, the controller is programmed to dynamically adjust a time window-specific battery current limit when any/all of the calculated time-windowed averages exceed a corresponding calibrated control threshold. The controller then enforces the adjusted battery current limit as a control action.

The above noted and other features and advantages of the present disclosure are readily apparent from the following detailed description of the best modes for carrying out the disclosure when taken in connection with the accompanying drawings.

BRIEF DESCRIPTION OF THE DRAWINGS

FIGS. 4A and 4B are schematic time plots describing an example application of the dynamic adjustment of battery current limits with respect to an RMS current.

DETAILED DESCRIPTION

Figure 1:
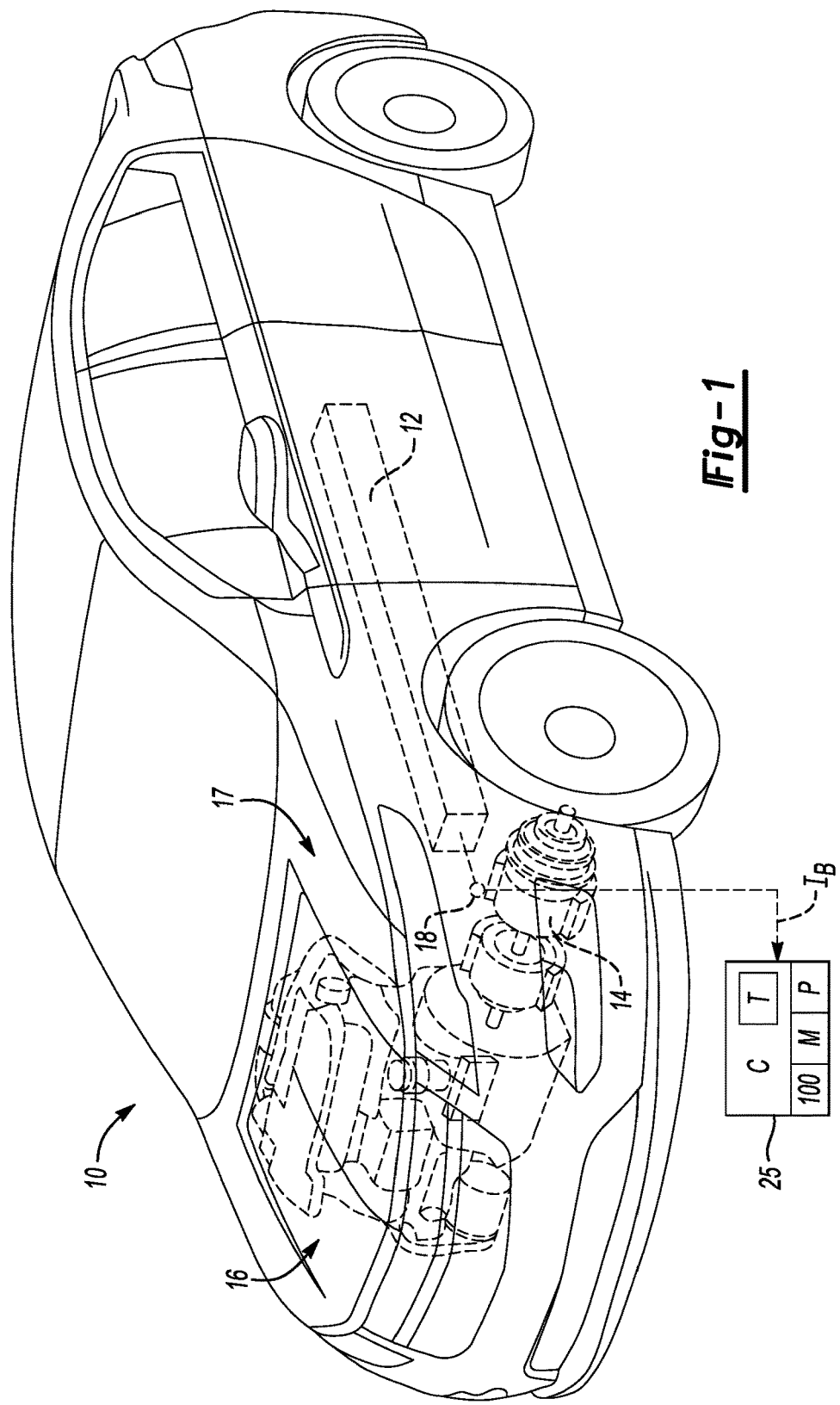
FIG. 1 is a schematic illustration of a system having a rechargeable battery pack and a method for dynamically adjusting battery current limits, with the system depicted as a non-limiting example vehicle.

Referring to the drawings, wherein like reference numerals are used to identify like or identical components in the various views, FIG. 1 schematically illustrates a system 10 having a battery pack 12 and a controller (C) 25. The controller 25 includes memory (M) that is programmed with a usage-based method 100 for dynamically adjusting battery current limits of the battery pack 12. The method 100, which may be programmed as a set of computer-executable instructions executed by a processor (P) of the controller 25, is intended to provide increased performance and protection of the battery pack 12 relative to conventional approaches. That is, the controller 25 automatically arbitrates battery current limits in such a manner that higher short-term current loads may be selectively permitted, thereby allowing for the provision and use of greater amounts of power relative to conventional methods of strict adherence to manufacturer-specified static or fixed current limits.

The battery pack 12 shown in FIG. 1 may be embodied as a rechargeable energy storage system having a plurality of individual battery cells (not shown). For instance, the battery pack 12 may be a relatively high-voltage energy storage device having 192-288 or more individual lithium ion battery cells in an example embodiment, with the battery cells being collectively capable of outputting at least 18-60 kWh of power depending on the configuration. While a vehicle is shown in FIG. 1 as a typical embodiment of the system 10, non-vehicular applications such as static powerplants may be envisioned, as well as non-automotive vehicle applications such as boats, trains, airplanes, robots, and other mobile platforms. For illustrative consistency, the system 10 of FIG. 1 will be described hereinafter as the vehicle 10 with additional reference to FIGS. 2 and 3.

The vehicle 10 may include a powertrain 17, for instance a hybrid electric powertrain as shown, a battery electric powertrain, or other electrified powertrain. The powertrain 17 may include one or more electric machines 14 and an internal combustion engine 16, the latter of which may draw electrical power from or deliver electrical power to the battery pack 12. The powertrain 17 may include an electrical sensor 18 operable for measuring or otherwise determining a magnitude and sign of a battery pack current (arrow $I_B$) and reporting these values to the controller 25.

In a possible embodiment, the electrical sensor 18 may be embodied as a current sensor operable for measuring a charge current flowing into or a discharge current flowing from the battery pack 12, with "charge" as used herein having a positive sign indicative of inflow of the battery pack current (arrow $I_B$) into the battery pack 12 and "discharge" having a negative sign indicative of an outflow of the battery pack current (arrow $I_B$) from the battery pack 12. In other embodiments, the electrical sensor 18 may be embodied as a voltage sensor operable for measuring an output voltage supplied to the electric machine 14, with the controller 25 calculating the battery pack current (arrow $I_B$) using the measured voltage.

The controller 25 of FIG. 1 may be embodied as one or more computer devices, each possibly having one or more microcontrollers or central processing units as the processor (P), and having sufficient amounts of the memory (M), e.g., read only memory, random access memory, and electrically-erasable programmable read only memory. The controller 25 may include a timer (T) for determining a plurality of different time windows as set forth below, and may also include input/output circuitry, and/or any other circuitry that may be required to perform the functions described herein. The controller 25 may be configured to run/execute various software programs, including the method 100 for dynamically adjusting battery current limits during operation of the vehicle 10.

Figure 2:
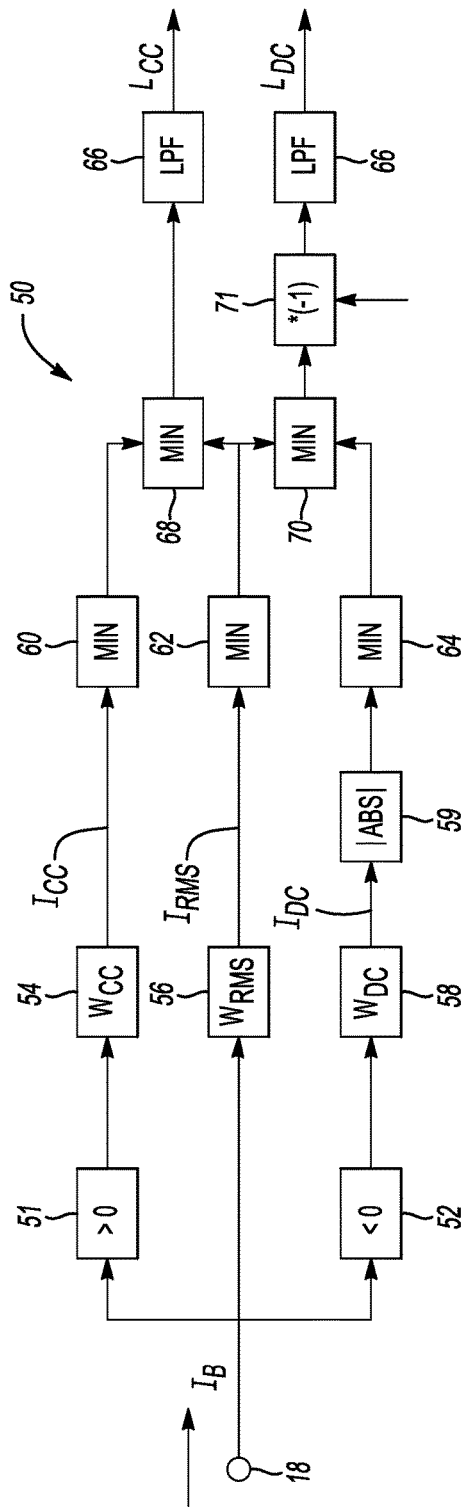
FIG. 2 is a schematic logic flow diagram for a controller usable as part of the vehicle shown in FIG. 1.

Referring to FIG. 2, a schematic logic flow 50 illustrates an example of the methodology executed by the controller 25 of FIG. 1 to implement the method 100. An embodiment of method 100 is also described below with reference to the flow chart of FIG. 3. Typically, battery current limits are set conservatively based on temperature, i.e., as a manufacturer-provided static or fixed limit for the battery pack 12 as a whole, and are intended to enable high current throughput over short durations. The method 100 provides flexibility in battery current limit operation to improve, in a dynamic manner, upon short-term performance while still protecting the hardware of the battery pack 12 relative to its static current limits.

The electrical sensor 18 shown in FIG. 1 measures or otherwise determines the battery pack current (arrow $I_B$), with the controller 25 determining the sign and magnitude of the battery pack current (arrow $I_B$) at logic blocks 51 and 52. That is, the controller 25 determines in any suitable manner whether the battery pack current (arrow $I_B$) has a positive sign (>0) at logic block 51 or a negative sign (<0) at logic block 52, or in other words, whether the battery pack 12 is actively charging or discharging.

At logic blocks 54, 56, and 58 the controller 25 calculates time-windowed averages for one or more current types. In the embodiment of FIG. 2, for instance, the controller 25 calculates a time-windowed average for a root mean square (RMS) current of the battery pack 12 at logic block 56, i.e., window $W_{RMS}$, an average charge current of the battery pack 12 at logic block 54 or window $W_{CC}$, and an average discharge current at logic block 58 or window $W_{DC}$. Thus, the outputs of logic blocks 54, 56, and 58 provide an average charge current $I_{CC}$, an average RMS current $I_{RMS}$, and an average discharge current $I_{DC}$, respectively. Logic block 59 outputs the absolute value (ABS) of the discharge current (arrow $I_{DC}$) to an additional logic block 64, which is further described below.

As is well known in the art, RMS current calculations perform mathematical operations on an alternating waveform, e.g., an oscillating AC sine wave of the type usually used as an offboard power supply to charge the battery pack 12 of FIG. 1, by determining the square of the magnitude of the waveform function, averaging the square over time, and then taking the square root. Thus, the RMS value produces the same average power for a given resistor as a constant DC current of the same value.

The number of time windows used as part of the method 100 may vary depending on the embodiment. For instance, up to eight time windows may be used in some embodiments, with additional time windows used in other embodiments. Different durations may be used for the RMS time windows relative to duration of any windows used for the charge and discharge currents, due for instance to the long-term heating implications of elevated sustained RMS current levels. In a typical embodiment, time windows for logic blocks 54 and 58 are 0.5 second (s), 1 s, 2 s, 10 s, and 30 s, while the time windows for logic block 56, i.e., the RMS windows, may be 0.5 s, 2 s, 10 s, 30 s, 120 s, 300 s, 600 s, and 3600 s. Such values are intended to be illustrative, and are referred to hereinafter solely for illustrative consistency.

If at any or all corresponding logic blocks 60, 62, and 64 for the respective charge, RMS, and discharge currents, each of which is labeled "MIN" in FIG. 2, a calculated current average for a given time window crosses a calibrated current control threshold as possibly determined via comparison to values stored in a lookup table from memory (M), the controller 25 of FIG. 1 automatically executes a control action with respect to the powertrain 17 by dynamically adjusting window-specific battery current limits applied at a given point in time. Logic blocks 68 and 70, also labeled "MIN" in FIG. 2, select the minimum of the charge/discharge current limit output from logic blocks 60 and 64, respectively, and the current limit output from logic block 62, i.e., the RMS current limit. Logic block 68 feeds this minimum value to a low-pass filter (LPF) block 66, while logic block 70 feeds the corresponding minimum for discharge current to a sign inverter (*−1) logic block 71 to restore the negative sign previously removed at logic block 59. Logic block 71 then feeds the sign-inverted value to another LPF block 66 as shown.

The LPF blocks 66 may be optionally used to smooth any transitions that occur when a given time window activates or deactivates, i.e., when a calculated average current violates a given time-windowed current limit or not, respectively, with filter constraints of the LPF blocks 66 being a function of the exceeded windowed control threshold as well as any transition from higher static current limits to lower window-based current limits. The LPF blocks 66 are used, therefore, after first determining at logic blocks 68 and 70 whether or not to apply an average RMS limit and/or an average charge or discharge limit as the battery current limit. The two logic blocks 66 output a final charge current limit (arrow $L_{CC}$) a final discharge current limit (arrow $L_{DC}$). As noted above, the final charge and discharge limits (arrows $L_{CC}$, $L_{DC}$) are thereafter used in controlling the powertrain 17 of FIG. 1, including such actions as executing a particular hybrid or battery electric drive mode, predicting a remaining electric range, etc.

With respect to logic blocks 54, 56, and 58 of FIG. 2, the controller 25 of FIG. 1 continuously calculates current averages over the designated window durations and records the averages in memory (M). For instance, for an example 2 s window in logic block 54, every 100 ms control loop the controller 25 may receive the measured battery current (arrow $I_B$) and calculate an average charge current over rolling 2 s intervals. The same operation occurs at logic block 56 where average RMS current is calculated over each of the designated time windows, and again at logic block 58 for the discharge current. The controller 25 then compares the calculated averages at logic blocks 60, 62, and 64 to calibrated window-specific thresholds. Charge or discharge battery current limits (arrow $L_{CC}$, $L_{DC}$) may be commanded or reported to hybrid control logic as a result of the above-described arbitration and thereafter used for control of the powertrain 17, route planning, and other control operations.

For instance, a manufacturer of the battery pack 12 may provide a fixed charge current limit for the battery pack 12 as a whole for a given operating temperature, e.g., 230 A. The controller 25 may also be programmed with corresponding time window-specific current control thresholds, which may be the same as or less than the static charge limit for the battery pack 12. Window-specific control thresholds, which are lower in magnitude than corresponding window-specific current limits, may also be programmed of, e.g., 220 A for 0.5 s and is windows, 200 A for the 2 s window, 180 A for a 10 s window, etc. The lower control thresholds are lower than the window-specific current limits by a calibrated offset, which may increase over longer time windows, e.g., starting at 5 A to 10 A for the 0.5 s window and increasing to 15 A for the 10 s window. Depending on the structure and function of the electric machine 14 and the battery pack 12, larger or smaller calibrated offsets may be used. By way of example, a wider calibrated offset may be used with a strong hybrid powertrain configuration relative to a mild/engine start-stop hybrid powertrain. In all cases, the control thresholds are smaller in magnitude than the window-specific current limits.

Example programmed logic for the logic blocks 60, 62, and 64 may be described and encoded as follows, using an example charge current scenario. For each calculated average charge current from logic blocks 54, 56, and 58:

IF Calculated Average Current>Average Current Control Threshold

THEN Average Current Limit=Average Current Limit

ELSE Average Current Limit=Static Current Limit.

Here, "Average Current" may be any or all of the charge current, discharge current, and RMS current. Thus, if the calculated average for each time window, for each current type, exceeds a corresponding lower control threshold, the controller 25 enforces an average current limit over that particular window. Otherwise, the controller 25 enforces the higher static charge limit for the battery pack 12 as set by the manufacturer. An application of the above-described schematic logic flow 50 of FIG. 2 is described in further detail below with reference to FIGS. 4A and 4B.

Figure 3:
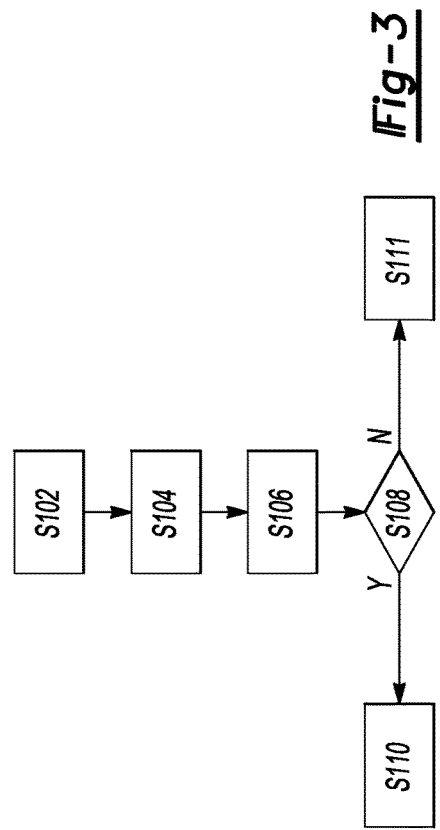
FIG. 3 is a flow chart describing an example of the method for dynamically adjusting battery current limits in a system having a rechargeable battery pack, such as the example system of FIG. 1.

FIG. 3 is a flow chart depicting an example embodiment of the method 100. Commencing at step S102, the electrical sensor 18 of FIG. 1 measures or otherwise determines the sign and direction of the battery current (arrow $I_B$) using any suitable conventional technologies, e.g., a current sensor or sense circuit, and relays the measured values to the controller 25. The method 100 proceeds to step S104.

At step S104, the controller 25 next calculates the average charge, discharge, and/or RMS current for each of a plurality of different time windows, i.e., as output from logic blocks 54, 56, and 58 of FIG. 2. While each of the charge, discharge, and RMS currents may be calculated and arbitrated as set forth below, other embodiments may use fewer than all of these values, or calculate all of them and use only one or two of the values in arbitrating the battery current limits. As noted above, the number and the duration of each time window may also differ depending on the embodiment. An example embodiment for charge/discharge windows, i.e., logic blocks 54 and 58 of FIG. 2, include 0.5 s, 1 s, 2 s, 10 s, 30 s, although other time windows may be used. Example RMS current windows include 0.5 s, 2 s, 10 s, 30 s, 120 s, 300 s, 600 s, and 3600 s. The controller 25, using a linear buffer, may calculate a rolling average for each window using samples taken every control loop, e.g., once every 100 ms. The method 100 proceeds to step S106 as the rolling averages for each time window continue to be calculated and recorded.

Step S106 includes comparing each calculated windowed averages for each current type to a calibrated window-specific current limit and lower control threshold, which may be recorded as reference values in memory (M) of the controller 25 of FIG. 1. This occurs at logic blocks 60, 62, and 64 of FIG. 2. For example, the controller 25 may include a lookup table in which a calibrated average current limit and a lower control threshold are recorded as numeric pairs for each time window. A non-limiting example of such numeric pairs includes, for the 0.5 s, 1 s, 2 s, and 10 s charge windows, each of numeric pairs (220 A/210 A), (220 A/210 A), (200 A/190 A), and (180 A/165 A). Discharge windows may be the same values with the opposite sign, e.g., (−180 A/−165 A) indicative of discharge. For RMS current, numeric pairs may include (300 A/290 A), (250 A/240 A), (200 A/190 A), and (175 A/160 A) for 0.5 s, 2 s, 10 s, and 30 s windows, respectively. The method 100 then proceeds to step S108.

At step S108, also conducted at logic block 62, 64, and 66 of FIG. 2, the controller 25 next determines, for each windowed average calculated at step S104, whether the calculated average for a given time window exceeds the corresponding current control threshold for that particular window, i.e., the lower of the two values of each numeric pair described in step S106. The method 100 proceeds to step S110 if the calculated windowed average exceeds the corresponding control threshold for that particular window, and to step S111 if the calculated windowed average does not exceed the corresponding control threshold.

Step S110 includes executing a control action via the controller 25 with respect to the battery pack 12 or powertrain 17 of FIG. 1. using the adjusted battery current limit. Step S110 may include enforcing the average current limit selected for the given time window. This value may be commanded as the final charge current limit (arrow $L_{CC}$ of FIG. 2) in controlling the battery pack 12. In other embodiments, as performed at logic blocks 68 and 70 of FIG. 2, the controller 25 of FIG. 1 may compare the average current limits from logic blocks 60 and 64 to a minimum RMS current limit from logic block 62 for the various windows, and select the minimum of the lower average current limit from step S110 and the RMS current limit, then use the selected minimum as the adjusted battery current limit, i.e., the charge current limit (arrow $L_{CC}$ of FIG. 2).

Step S111 includes selecting the static current limit, i.e., the pack limit. This value may be commanded as the final charge current limit (arrow $L_{DC}$ of FIG. 2) in controlling the battery pack 12. As within step S110, the controller 25 may compare the average current limit, whether charge or discharge, to a minimum RMS current limit from the various windows and select the minimum value as the final charge current limit (arrow $L_{CC}$ of FIG. 2).

Thus, between steps S110 and S111, if none of the time windows are active, i.e., if none of the averages exceed their corresponding calibrated control threshold, the higher manufacturer-provided static pack current limit is communicated by the controller 25 to any power capability estimation/hybrid strategy control modules, whether residing in the controller 25 or a separate control device. If one or more average currents for a given time window is above its corresponding control threshold, however, the lowest-magnitude current limit associated with the violated control thresholds is communicated by the controller 25 to the power capability estimation/hybrid strategy control modules, with the controller 25 executing a control action with respect to the powertrain 17 of FIG. 1 in embodiments in which the method 100 is used in the vehicle 10.

FIGS. 4A and 4B depict an example application of the method 100 in the context of RMS current, i.e., trace 75, with magnitude of the RMS current in amps (A) plotted on the vertical axis and time (t) plotted on the horizontal axis for an example 120 s window. Although not shown, a similar control result occurs for charge and discharge current. The window-specific RMS current limit is indicated as line CL, while the lower/offset calibrated control threshold is indicated by line CT. The manufacturer-provided static current limit, line SL, is also depicted.

As depicted in FIG. 4A, without imposition of the time-based adjustable current limits using the method 100 as described herein, a given windowed average RMS control threshold (line CT) and windowed average current limit (CL) are permitted to be exceeded in various regions 76, without exceeding the static limit of line SL. However, with the time-based adjustable current limits dynamically applied and selectively enforced as shown in FIG. 4B for the same example RMS values, the window-specific current limit (line CL) is enforced over the same indicated time window. That is, the battery current depicted as trace 75 in FIG. 4B is allowed to exceed the window-specific control threshold (line CT), but the battery control actions of the controller 25, via imposition of the current limits (arrows $L_{CC}$, $L_{DC}$) of FIG. 2, ensure that the battery current (trace 75) is always less than the window-specific current limit (line CL) and the static limit (line SL).

Optionally, the individual windowed control thresholds noted above may be adapted or adjusted over time. For instance, the controller 25 of FIG. 1 may track over time how closely the average current values for a given current type, whether charge, discharge, or RMS, approach the corresponding current limit for that particular current type. The controller 25 could selectively allow the battery current to come as close as possible to and possibly slightly exceeding its window-specific control threshold without exceeding the current limit, as best shown by the trajectory of trace 75 in FIG. 4B. If the difference between the calculated average current and the average current limit tends to be large relative to a calibrated difference, the controller 25 can slightly increase the control threshold for that particular time window. Likewise, if the difference tends to be small over time for a given window, the controller 25 can slightly decrease the corresponding control threshold, e.g., adjusting downward by 0.1 A or another suitable low value, in this manner tuning or adapting the control thresholds to actual performance over time.

While the best modes for carrying out the disclosure have been described in detail, those familiar with the art to which this disclosure relates will recognize various alternative designs and embodiments lying within the scope of the appended claims. It is intended that all matter contained in the above description and/or shown in the accompanying drawings shall be interpreted as illustrative only and not as limiting.

The invention claimed is:

1. A method for dynamically adjusting a battery current limit in a system having a battery pack, the method comprising:
   calculating a time-windowed average current for each of a charge current into the battery pack, a discharge current from the battery pack, and an RMS current of the battery pack;
   dynamically adjusting the battery current limit when at least one of the calculated time-windowed average currents exceeds a corresponding calibrated control threshold, wherein the battery current limit is a window-specific current limit that is greater than the calibrated control threshold and less than a fixed current limit for the battery pack; and
   executing a control action via the controller with respect to the battery pack using the adjusted battery current limit.

2. The method of claim 1, wherein calculating a time-windowed average current is conducted over a plurality of different time windows.

3. The method of claim 2, wherein the plurality of different time windows for the charge and discharge currents include time windows of 0.5 seconds (s), 1 s, 2 s, 10 s, and 30 s, and wherein the plurality of different time windows for the RMS current includes time windows of 0.5 s, 2 s, 10 s, 30 s, 120 s, 300 s, 600 s, and 3600 s.

4. The method of claim 1, further comprising: dynamically adjusting the battery current limit when more than one of the calculated time-windowed average currents exceeds the corresponding calibrated control threshold.

5. The method of claim 1, further comprising: for each calculated time-windowed average current, comparing the calculated time-windowed average current to the corresponding calibrated control threshold and enforcing the window-specific current limit via control of the battery pack if the calculated time-windowed average current exceeds the calibrated control threshold, and enforcing the static current limit in the alternative if the calculated time-windowed average current does not exceed the calibrated control threshold.

6. The method of claim 1, further comprising: using a minimum of the window-specific current limit and the calculated time-windowed average RMS current as the battery current limit.

7. The method of claim 1, further comprising: tracking, via the controller, how closely the calculated average current approaches the window-specific current limit; and
   increasing or decreasing the control threshold as a function of a difference between the calculated average current and the window-specific current limit.

8. The method of claim 1, wherein the system is a vehicle having an electric machine powered via the battery pack.

9. A system comprising:
   a battery pack having a fixed current limit;
   a sensor operable for measuring a battery pack current, wherein the battery pack current may be a charge current into or a discharge current from the battery pack; and
   a controller operable for receiving the measured battery pack current and calculating a time-windowed average current for each of the charge current, the discharge current, and an RMS current of the battery pack, wherein the controller is programmed to dynamically adjust a time window-specific battery current limit when at least one of the calculated time-windowed average currents exceeds a corresponding calibrated control threshold, and wherein the battery current limit is a window-specific current limit that is greater than the calibrated control threshold and less than the static current limit of the battery pack.

10. The system of claim 9, further comprising an electric machine that is electrically connected to and powered by the battery pack.

11. The system of claim 10, wherein the system is a vehicle and the electric machine provides an output torque sufficient for propelling the vehicle.

12. The system of claim 9, wherein the controller is programmed to dynamically adjust the battery current limit when more than one of the calculated time-windowed averages exceeds the corresponding calibrated control threshold.

13. The system of claim 11, wherein the controller is programmed to dynamically adjust the battery current limit when each of the calculated time-windowed averages exceeds the corresponding calibrated control threshold.

14. The system of claim 9, wherein the controller is programmed, for each calculated time-windowed average current, to compare the calculated time-windowed average current to the corresponding calibrated control threshold and enforce the window-specific current limit via control of the battery pack if the calculated time-windowed average current exceeds the calibrated control threshold, and enforce the static current limit in the alternative if the calculated time-windowed average current does not exceed the calibrated control threshold.

15. The system of claim 9, wherein the controller is further programmed to use a minimum of the window-specific current limit and the calculated time-windowed average RMS current as the battery current limit.

16. The system of claim 15, wherein the controller is further programmed to track how closely the calculated average current approaches the window-specific current limit; and
   increase or decrease the control threshold as a function of a difference between the calculated average current and the window-specific current limit.

* * * * *